United States Patent [19]

Harrison

[11] Patent Number: 5,800,176
[45] Date of Patent: Sep. 1, 1998

[54] METHOD AND APPARATUS FOR PREPARATORY READING

[76] Inventor: Dale Martin Harrison, Mossley Hill 46 Greenbank Road, Liverpool, England, L18 1HN

[21] Appl. No.: 833,903

[22] Filed: Apr. 10, 1997

[51] Int. Cl.$^6$ ............................................. G09B 17/00
[52] U.S. Cl. ............................................. 434/172; 434/178
[58] Field of Search ......................... 273/299; 434/171, 434/172, 209, 178, 184

[56] References Cited

U.S. PATENT DOCUMENTS

| | | | |
|---|---|---|---|
| 1,246,152 | 11/1917 | Perrine | 434/209 |
| 1,557,824 | 10/1925 | Fritz | 273/299 |
| 1,584,627 | 5/1926 | Marino | 434/178 |
| 2,091,555 | 8/1937 | Messinger | 434/172 |
| 2,265,334 | 12/1941 | Armbruster | 273/299 |
| 2,636,496 | 4/1953 | Hollop | 434/172 |
| 3,704,338 | 11/1972 | Shore | 434/172 |
| 4,204,343 | 5/1980 | Brooks | 434/172 |
| 4,219,197 | 8/1980 | Acuff | 434/172 |
| 4,262,431 | 4/1981 | Darnell | 434/172 |
| 4,427,390 | 1/1984 | Nina | 434/172 |
| 4,490,118 | 12/1984 | Stewart | 434/172 |
| 5,277,586 | 1/1994 | Branch | 434/184 |
| 5,417,432 | 5/1995 | Dwyer | 273/299 |

*Primary Examiner*—Paul J. Hirsch

[57] ABSTRACT

A new method and apparatus for preparatory reading, for preparing people, particularly children, to read. The inventive device includes a series of cards imprinted with the letters of the alphabet and selected combinations of letters representing definite phonic sounds. The cards are separated into a first group composed entirely of the alphabet letters and a plurality of other groups composed of related ones of the letter combinations. The card groups are then individually reviewed, starting with the alphabet letters, until each group is mastered by the learner.

3 Claims, 3 Drawing Sheets

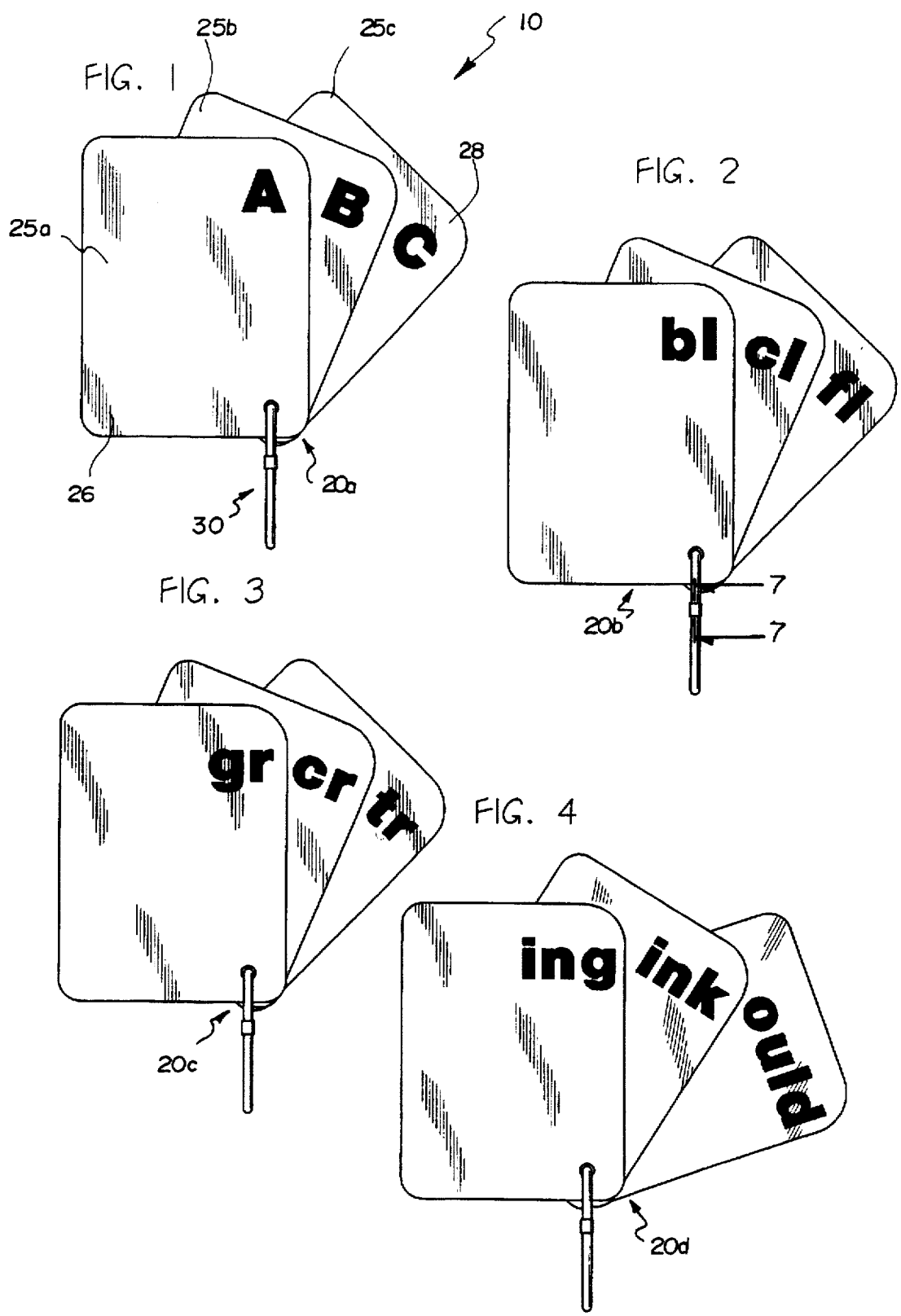

FIG. 5
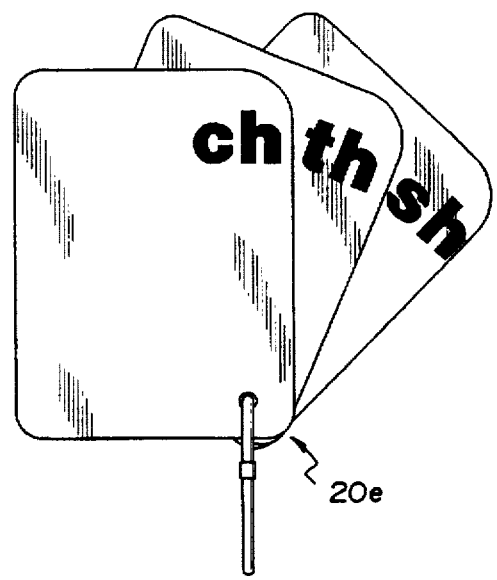
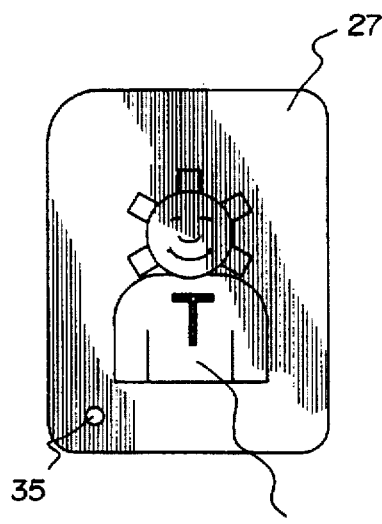
FIG. 6
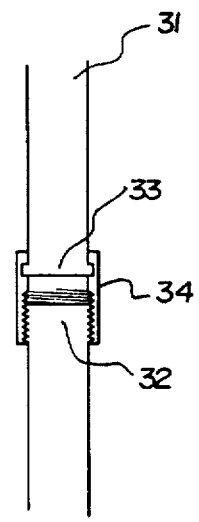
FIG. 7

METHOD AND APPARATUS FOR PREPARATORY READING

BACKGROUND OF THE INVENTION

1. Field of the Invention

The present invention relates to teaching aids and more particularly pertains to a new method and apparatus for preparatory reading for preparing people, particularly children, to read.

2. Description of the Prior Art

The use of teaching aids is known in the prior art. More specifically, teaching aids heretofore devised and utilized are known to consist basically of familiar, expected and obvious structural configurations, notwithstanding the myriad of designs encompassed by the crowded prior art which have been developed for the fulfillment of countless objectives and requirements.

Known prior art teaching aids include U.S. Pat. No. 5,277,586; U.S. Pat. No. 3,755,921; U.S. Pat. No. Des. 327,229; U.S. Pat. No. 5,100,326; U.S. Pat. No. 3,874,096 and U.S. Pat. No. 3,789,517.

While these devices fulfill their respective, particular objectives and requirements, the aforementioned patents do not disclose a new method and apparatus for preparatory reading. The inventive device includes a series of cards imprinted with the letters of the alphabet and selected combinations of letters representing definite phonic sounds. The cards are separated into a first group composed entirely of the alphabet letters and a plurality of other groups composed of related ones of the letter combinations. The card groups are then individually reviewed, starting with the alphabet letters, until each group is mastered by the learner.

In these respects, the method and apparatus for preparatory reading according to the present invention substantially departs from the conventional concepts and designs of the prior art, and in so doing provides an apparatus primarily developed for the purpose of preparing people, particularly children, to read.

SUMMARY OF THE INVENTION

In view of the foregoing disadvantages inherent in the known types of teaching aids now present in the prior art, the present invention provides a new method and apparatus for preparatory reading wherein the same can be utilized for preparing people, particularly children, to read.

The general purpose of the present invention, which will be described subsequently in greater detail, is to provide a new method and apparatus for preparatory reading which has many of the advantages of the teaching aids mentioned heretofore and many novel features that result in a new method and apparatus for preparatory reading which is not anticipated, rendered obvious, suggested, or even implied by any of the prior art teaching aids, either alone or in any combination thereof.

To attain this, the present invention generally comprises a series of cards imprinted with the letters of the alphabet and selected combinations of letters representing definite phonic sounds. The cards are separated into a first group composed entirely of the alphabet letters and a plurality of other groups composed of related ones of the letter combinations. The card groups are then individually reviewed, starting with the alphabet letters, until each group is mastered by the learner.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new method and apparatus for preparatory reading which has many of the advantages of the teaching aids mentioned heretofore and many novel features that result in a new method and apparatus for preparatory reading which is not anticipated, rendered obvious, suggested, or even implied by any of the prior art teaching aids, either alone or in any combination thereof.

It is another object of the present invention to provide a new method and apparatus for preparatory reading which may be easily and efficiently manufactured and marketed.

It is a further object of the present invention to provide a new method and apparatus for preparatory reading which is of a durable and reliable construction.

An even further object of the present invention is to provide a new method and apparatus for preparatory reading which is susceptible of a low cost of manufacture with regard to both materials and labor, and which accordingly is then susceptible of low prices of sale to the consuming public, thereby making such method and apparatus for preparatory reading economically available to the buying public.

Still yet another object of the present invention is to provide a new method and apparatus for preparatory reading which provides in the apparatuses and methods of the prior art some of the advantages thereof, while simultaneously overcoming some of the disadvantages normally associated therewith.

Still another object of the present invention is to provide a new method and apparatus for preparatory reading for preparing people, particularly children, to read.

Yet another object of the present invention is to provide a new method and apparatus for preparatory reading which includes a series of cards imprinted with the letters of the alphabet and selected combinations of letters representing definite phonic sounds. The cards are separated into a first group composed entirely of the alphabet letters and a plurality of other groups composed of related ones of the letter combinations. The card groups are then individually reviewed, starting with the alphabet letters, until each group is mastered by the learner.

Still yet another object of the present invention is to provide a new method and apparatus for preparatory reading that is simple for teachers and parents to teach children with.

Even still another object of the present invention is to provide a new method and apparatus for preparatory reading that gives a young learner roughly a two year head start in reading.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of a card group containing the alphabet letters.

FIGS. 2–5 are front views of other card groups containing related letter combinations.

FIG. 6 is a rear view of one of the cards showing the character face.

FIG. 7 is a cross sectional view taken along line 7—7 of FIG. 2.

DESCRIPTION OF THE PREFERRED EMBODIMENT

Figure 8:
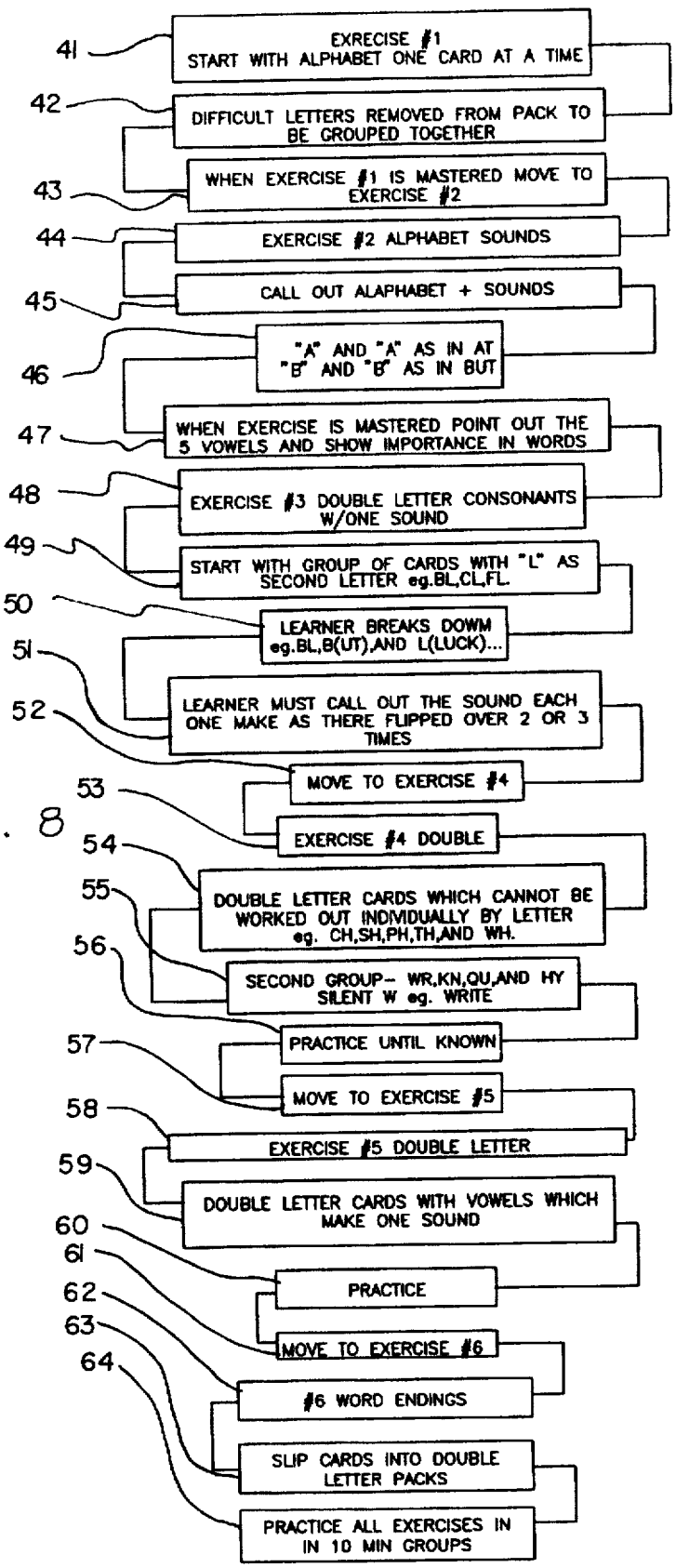
FIG. 8 shows the steps in the teaching method.

With reference now to the drawings, and in particular to FIGS. 1 through 7 thereof, a new apparatus for preparatory reading embodying the principles and concepts of the present invention and generally designated by the reference numeral 10 will be described.

More specifically, it will be noted that the apparatus for preparatory reading 10 comprises a first group 20a having a plurality of rectangular cards 25a–z loosely secured together. Each card 25a–z has a front face 26 and a rear face 27, and is made of a generally flat, rigid material, such as cardboard or plastic. The corners of the rectangular cards 25a–z are rounded, and one corner of each card, such as the upper right hand corner 28, is made different from the remaining three corners, such as by providing a larger radius to the corner 28 relative to the other corners. The different corner 28 thus provides an indication of how the cards should be oriented for proper viewing thereof, facilitating gathering of the cards 25a–z into the group 20a.

As best illustrated in FIG. 1, it can be shown that one letter of the alphabet is imprinted on the front face 26 of each card 25a–z adjacent the upper right hand corner thereof. Thus the letter "A" is printed on card 25a, the letter "B" on card 25b, etc., up to the letter "Z" on card 25z. Although FIG. 1 only shows the three cards 25a–c, it should be realized that the group 20a contains twenty-six cards, one card for each letter of the alphabet. Additionally, although the letters are shown in upper case, it should be realized that lower case letters, or a combination of both upper and lower case, can be used.

The apparatus 10 also includes further groups 20b, 20c, 20d, 20e of cards, which are similar to the cards 25a–z except that the cards in groups 20b–e have letter combinations imprinted thereon which represent definite, common phonic sounds in the English language. Referring to FIG. 2, it is seen that the group 20b is composed of letter combinations having the letter "L" as its second letter, e.g. BL, CL, FL, GL, PL, and SL. The group 20c is composed of letter combinations having the letter "R" as its second letter, e.g. GR, CR, TR, BR, DR, FR, and PR. The group 20d is composed of letter combinations forming word endings, e.g. ING, INK, OULD, TION, ONG, and IGHT. The group 20e is composed of letter combinations having the letter "H" as its second letter, e.g. CH, TH, SH, PH, and WH. A further group of cards (not shown) in the apparatus 10 includes the letter combinations SC, SK, SM, SN, SS, SP, ST, SW, and TW. Another group (not shown) includes the letter combinations WR, KN, QU, and HY. A final group (not shown) includes the letter combinations EE, OO, EW, OR, AW, ER, IR, AI, AY, OI, OY, and AR. Again, upper case letters, lower case letters, or a combination of the two, can be used.

Therefore the apparatus includes a total of 75 cards having either the individual letters of the alphabet or selected letter combinations, grouped into separate groups as set forth above.

As illustrated in FIGS. 1–7, the cards in each group are loosely secured together using a securement means 30. Referring to FIG. 7, the securement means 30 comprises a loop 31 having a first, externally threaded end 32 and a second end 33 having an internally threaded collar 34 rotationally secured thereto. As is evident, the two ends 32, 33 are secured together by screwing the collar 34, which rotates relative to the end 33, onto the threaded end 32, thus forming the loop 31. The loop 31 is disposed through a hole 35 which is formed in the lower right hand corner of each card when facing the front of the cards.

In order to make the cards more appealing to children, each of the cards has a character face 29 imprinted on the rear face 27 thereof, as is illustrated in FIG. 6.

Referring now to FIG. 8, the teaching method using the apparatus 10 of FIGS. 1–7 is illustrated. The method is broken down into a series of exercises utilizing the individual groups of cards. Each exercise takes approximately ten minutes and should be repeated until each exercise is mastered.

The first exercise involves taking the group 20a of alphabet letters in alphabetical order and having the learner call out the name of each letter as the cards are flipped over (box 41). The letters can be subdivided into smaller groups to make the exercise less tiresome. Any letters found to be causing difficulties are extracted and formed into its own pack to be later practiced (box 42). Once all the individual letters are easily called out by the learner, you can move to exercise two (box 43).

Exercise two (box 44) involves again using the group 20a of alphabet letters and having the learner call out the alphabet names plus the sounds of each letter (box 45), such as "A" and "A (as in 'at')", "B" and "B (as in 'but')", and so on for each letter (box 46). Once the learner masters this portion, the letters can be shuffled so as to practice the letters in a random order. Before moving to step three, the five vowels and the letter "Y" should be removed, and their importance in the English language should be emphasized (box 47).

Exercise three involves double letter consonants with one sound (box 48). Start by taking group 20b having the letter "L" as its second letter (box 49), and having the learner break down each letter combination. For instance, for BL, B(UT) and L(UCK) make BL (box 50). This is repeated for each card in group 20b. The learner must then call out the sound each letter combination makes (box 51). The above steps are repeated for the group 20c, e.g. GR, CR, TR, BR, DR, FR, and PR, and for the group composed of SC, SK, SM, SN, SS, SP, ST, SW, and TW, before moving to exercise four (box 52).

Exercise four (box 53) is more double consonants with one sound, but which cannot be worked out individually by letter (box 54). The group 20e is used, which is composed of letter combinations having the letter "H" as its second letter, e.g. CH, TH, SH, PH, and WH. Each combination must be taken one by one and demonstrated by the teacher. Next, the group having the letter combinations WR, KN, QU, and HY is used (box 55), with it being emphasized that WR has a silent "w" as in the word 'write', KN has a silent "k" as in 'knot', QU is said as QU(EEN), and HY should be said as HY(PHEN). Each group is practiced until known (box 56) and then move on to exercise five (box 57).

Exercise five involves double letter sounds with vowels which make one sound (box 58). The group having the letter combinations EE, OO, EW, OR, AW, ER, IR, AI, AY, OI, OY, and AR is used (box 59), and practiced the same as in the previous exercises (box 60). The cards in this group can then be placed with all the previous double letter cards, and the entire group then practiced as before, before moving to exercise six (box 61).

Exercise six pertains to word endings, and for this exercise group 20d is used (box 62). These letter combinations are practiced until each is known, and then they are placed with all the double letters (box 63), and all the cards practiced again.

It should be emphasized that all exercises should be practiced in ten minute increments (box 64) to accommodate the short attention span of young learners.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A teaching aid for preparing a person to read, comprising:

a series of cards having selected individual letters and combinations of letters imprinted on the cards;

wherein each card is generally rectangular defining four corners;

a hole formed through each card adjacent one of said corners;

a binding means for grouping selected cards together, said binding means including a cylinder formed substantially into a loop, said cylinder having a first threaded end and a second end having a flared rim;

wherein said binding means further includes a collar having a groove corresponding to said flared rim and surrounding said flared rim such that said collar is coupled to said second end and may rotate about said second end, said collar having a threaded interior removably engageable to said first threaded end; and wherein said individual letters and letter combinations comprise the following:

| A | I | Q | Y | BR | SK | CH | HY | AI | ONG |
|---|---|---|---|----|----|----|----|----|-----|
| B | J | R | Z | CR | SM | SH | EE | AY | IGHT |
| C | K | S | BL | DR | SN | PH | OO | OI | OULD. |
| D | L | T | CL | FR | SS | TH | EW | OY | |
| E | M | U | FL | GR | SP | WH | OR | AR | |
| F | N | V | GL | PR | ST | WR | AW | TION | |
| G | O | W | PL | TR | SW | KN | ER | ING | |
| H | P | X | SL | SC | TW | QU | IR | INK | |

2. The teaching aid of claim 1, wherein each said card includes front and rear faces, said individual letters and letters combinations are imprinted on the front faces of the cards, and further comprising a character face imprinted on the rear face of each card.

3. A method of preparing a person to read by use of a plurality of instructional cards imprinted with the individual letters of the alphabet and selected combinations of letters representing definite phonic sounds, the method comprising the following steps:

a) providing a set of cards, each card imprinted with individual letters of the alphabet and selected combinations of letters representing phonic sounds;

b) reviewing each card imprinted with individual letters of the alphabet;

c) removing those cards the person has difficulty learning and making a first group of those cards using a hole provided in each of said cards and a removable binding means for holding the first group together;

d) reviewing each card imprinted with a letter in the alphabet that is not in the first group and stating the sound represented by each card;

e) reviewing each card in the first group and stating the sound represented by each card;

f) repeating steps a through e using the cards imprinted with selected combinations of letters representing phonic sounds;

g) repeating steps a through e using combinations of cards imprinted with individual letters of the alphabet and cards imprinted with selected combinations of letters representing phonic sounds.

* * * * *